United States Patent

Wilkinson et al.

[11] Patent Number: 5,837,372
[45] Date of Patent: Nov. 17, 1998

[54] PLIABLE TACKIFIED FIBER TOW AND METHOD OF PRODUCING SAME

[75] Inventors: Curt Goodwyn Wilkinson, Wallingford; Mark Oldham, Meriden; Ronald David Gross, Storrs, all of Conn.

[73] Assignee: The Dow Chemical Company, Midland, Mich.

[21] Appl. No.: 643,538

[22] Filed: May 6, 1996

[51] Int. Cl.$^6$ ..................................................... D02G 3/00

[52] U.S. Cl. ........................... 428/400; 428/375; 428/357; 428/408

[58] Field of Search .................................... 428/408, 102, 428/114, 375, 357, 400

[56] References Cited

U.S. PATENT DOCUMENTS

| | | | |
|---|---|---|---|
| 5,198,281 | 3/1993 | Muzzy et al. | 428/102 |
| 5,409,757 | 4/1995 | Muzzy et al. | 428/114 |
| 5,427,725 | 6/1995 | White et al. | 428/408 |

Primary Examiner—Newton Edwards

[57] ABSTRACT

A pliable tackified tow comprises a plurality of fibers having a tackifier present at about 1–15 per cent by weight uniformly distributed among the fibers. The tackifier is a solid material which has been fractured through fiber displacement such, as by physical bending, to produce a fiber tow that is pliable. The pliable tackified tow can be used in braiding, weaving, or filament winding operations to produce dry fabric which contains a tackifier between the individual fibers such that preforms produced using the tackified tow can be readily shaped and hardened to retain that shape prior to molding.

5 Claims, 2 Drawing Sheets

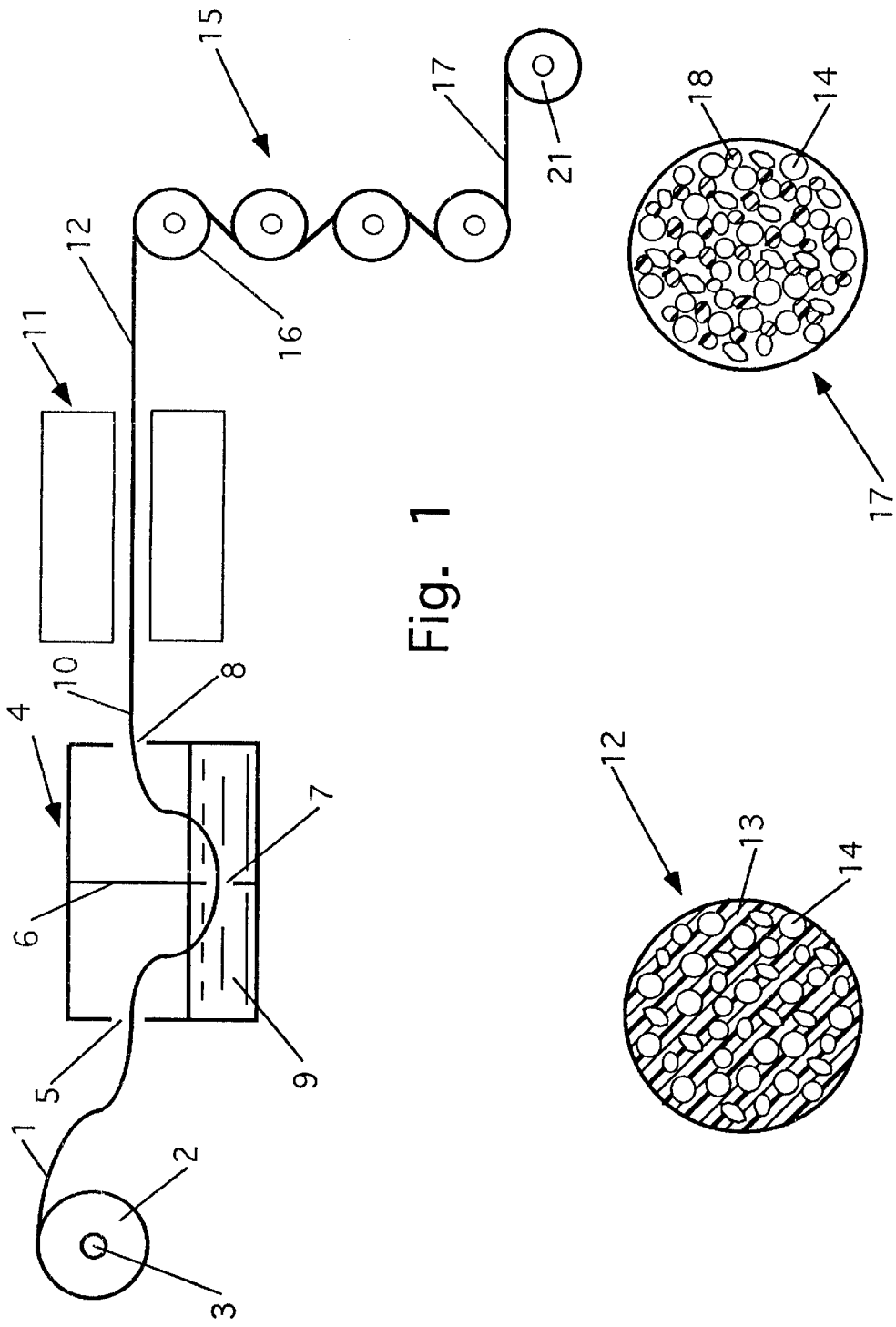

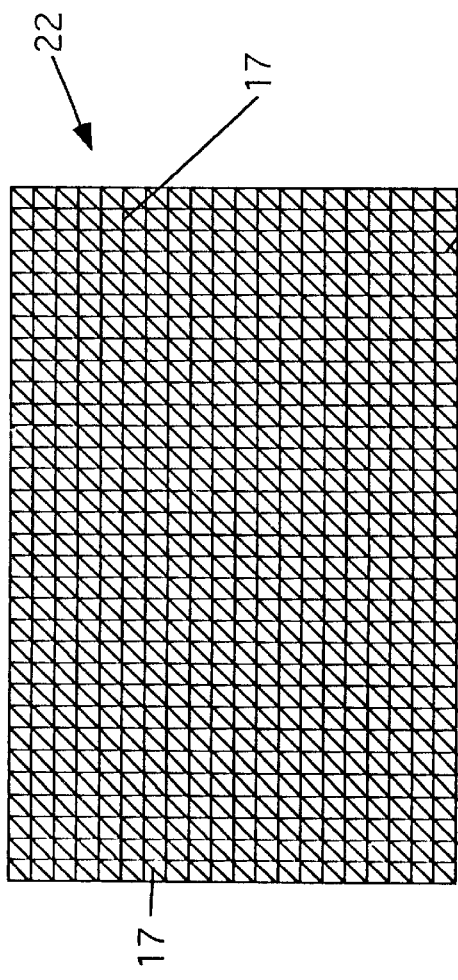
Fig. 5
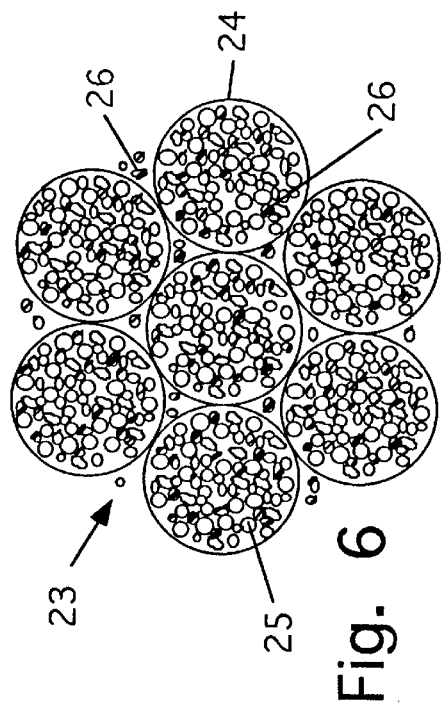
Fig. 6
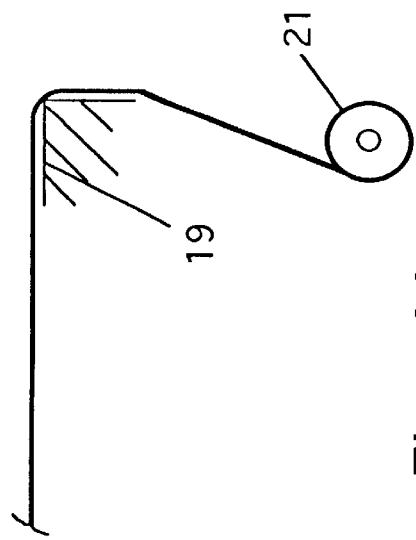
Fig. 4A
Fig. 4B

PLIABLE TACKIFIED FIBER TOW AND METHOD OF PRODUCING SAME

TECHNICAL FIELD

This invention relates to fiber tows used in braiding, weaving or winding of fiber reinforcement for use in plastic composite parts, and more particularly to a fiber tow which contains a tackifier dispersed among the fibers within the tow, for promoting the production of debulked shaped dry fiber preforms.

BACKGROUND

Various stabilizers or tackifiers are available which have been used to bond adjacent fiber plys together in a particular orientation and shape, to produce a dry fiber preform.

In U.S. Pat. Nos. 5,080,851 and 5,217,766, stabilized complex preforms and methods for producing those are discussed. Specifically, a powdered tackifier is distributed over a fabric layer in an amount of about 1–15 percent by weight, preferably 1–5 percent by weight. Additional tackifier is applied to each subsequent layer. After the tackifier is applied, the layers are shaped and heated to melt the tackifier which when cooled, holds the plys in their shaped form.

In U.S. Pat. No. 5,204,033, there is described a method for fabricating a filament wound preform for a resin transfer molding process where during filament winding, a tackifier is applied to the filament as it is fed through a bath of acetone solvent which contains a tackifier. Additional tackifier solution may be sprayed directly onto the wound fiber.

In each case, after the solvent is removed, a rigid preform is obtained for molding in a resin transfer molding operation.

However, the processes described above have some disadvantages. First, powder handling equipment is required during the assembly of preforms from woven fabric plys. Adding powder between layers also slows the assembly process. In processes using winding or braiding, the additional step of drawing the fibers through a solvent bath substantially slows the process down, while additionally requiring special facilities for forming the wet solvent soaked preform, and for evaporating the solvent using solvent recovery equipment. There is a need to overcome these disadvantages to increase the rate of preform production.

SUMMARY OF THE INVENTION

It is an object of the present invention to provide a raw fiber material which contains a tackifier prior to the winding, weaving or braiding step.

It is a further object of the present invention to provide a tackified fiber material which is as pliable and flexible as non-tackified fiber material.

These and other objects of the present invention are achieved by a tackified fiber tow consisting essentially of a plurality of fibers assembled in the form of a tow, and a tackifier present at about from 1–10 percent by weight integrated with the fibers, the tackifier being a fractured solid material such that the fiber tow is pliable.

A method for producing a pliable tackified tow comprises providing a fiber tow, treating the fiber tow with a tackifier dissolved in a solvent such that the tackifier infiltrates between the fibers in the tow, drying the fiber tow to remove the solvent, leaving a solidified tackifier between the fibers, to form a rigid fiber tow, and fracturing the tackifier by displacing the fibers within the tow such that the fiber tow becomes pliable.

A pliable tackified fiber tow can be used in braiding, weaving and winding operations to the same extent and with the same speed as untackified tows. Yet, each article produced from the tow is pretackified, meaning that it is ready for shaping into a desired form without any intermediate application of tackifier. Once shaped, the fibers are heated to melt the tackifier so that the shaped form is maintained. This substantially increases the speed with which dry fiber preforms can be produced, while at the same time substantially reducing the capital costs required for solvent and powder handling equipment.

BRIEF DESCRIPTION OF THE DRAWINGS

FIG. 1 is an overall view of the process of the invention.

FIG. 2 is a cross sectional view of the tow 12.

FIG. 3 is a cross sectional view of the tow 17.

FIG. 4a is an alternative method for fracturing the tackified fiber tow in accordance with the present invention;

FIG. 4b is another alternative method for fracturing the tackified fiber tow.

FIG. 5 is a fabric ply made of the pliable tackified tow.

FIG. 6 is an alternative embodiment of the invention showing a pliable tackified yarn.

DETAILED DESCRIPTION OF THE INVENTION

The invention is a pliable tackified tow and a method for producing the pliable tackified tow. The term "tow" means a loose untwisted rope of filaments which may include graphite, glass, aramid or other filaments for use in reinforcement of plastic composite parts. For the purposes of this application, the term "tow" will include yarns which are multiple tows. The term "tackified" means that there is a sufficient amount of a resin present among the fibers in the tow such that an article produced from the tow, after it is heated and cooled, can be held by the tackifier in a shaped condition. The term "pliable" means, that the tackified tow has sufficient flexibility for machine manipulation for braiding, weaving, filament winding, etc. to the same extent as non-tackified fiber tow of the same size. The terms "tackifier" and "stabilizer" are used interchangeably to describe the resin distributed among the fibers in the tow, which is capable of holding the fibers together in a desired shape. The term "fractured" means that the solid tackifier is broken into substantially discrete particles.

Referring to FIG. 1, a tow 1 is contained on a spool 2 which is rotatably mounted on a spindle 3. The tow is a bundle of fibers, as described above. Generally from 3,000 to 50,000 fibers may be incorporated in a single tow. Further, the present invention is applicable to producing pliable tackified yarns which are produced of multiple tows, and which are also usable in braiding, weaving and winding operations. However, for the sake of simplifying the description, the following method is described relative to a single tow, it being understood that multiple tow yarns may be used.

The tow 1 is pulled off the spool 2 and enters a treatment tank 4 having an entrance opening 5, a baffle 6 having a submersion opening 7, and an exit opening 8. The tank contains a solvent tackifier mixture 9.

Both aqueous and non-aqueous solvents may be used. Preferred solvents are acetone and water though other solvents may be used. Suitable tackifiers are those described in U.S. Pat. Nos. 4,992,228, 5,080,851, 5,427,725 and 5,427,726 which are incorporated by reference to the extent necessary to understand the invention. These are principally thermosetting resin based tackifiers. Other suitable tackifiers include resins such as epoxy, polyamide, particularly bismaleimide resins, polycyanate ester resins, vinyl ester resins, benzocyclobutene resins, etc.

Examples of suitable tackifiers composed of resin and hardener mixtures includes a mix of epoxy resin such as Tactix 123 epoxy resin made by Dow Chemical Company or PR 500 manufactured by 3M. Another suitable resin is 1, 1'-MDA bismaleimide (BMI) resin, known within the field as 5250-4 RTM BMI resin manufactured by Cytec Chemical Co.

These are exemplary resins which are useful since many components are produced utilizing either epoxy resin or BMI resin and therefore these are compatible in those systems. However, other resins can easily be identified by one skilled in the art for use with specific resin systems and the invention is not limited to those discussed herein.

For exemplary purposes, the tank 4 contains a solvent of BMI resin present at about 12 percent by weight in an acetone solvent.

Generally, about 12 percent in solution will correspond to about a 10% retention among the fibers. From 1 to 15% by weight is desired in the pliable tackified tow, with 4 to 12% preferred. Thus, up to about 20% tackifier may be present in the solution, with the amount correlated to the desired dried product.

The tow 1 is pulled from the spool 2 and travels through the entrance, submersion and exit openings such that the fiber tow is fully immersed within the solvent tackifier mixture for sufficient time so that the fiber tow is fully saturated with the solution. A wet fiber 10 exits the treatment tank and then proceeds to a drying station 11 which is an area where the fiber tow is treated to drive off the solvent. As the solvent is removed, the tackifier within the tow precipitates and solidifies such that a dry rigid fiber 12 exits the drying station.

Various methods may be used to drive off the solvent such as by using hot air, electrical resistance or radiation heating, microwave energy, etc. For some solvents, such as acetone which readily flashes off, dry room temperature air is sufficient to remove the solvent. Of course, the time for drying will depend on the choice and amount of solvent contained in the fiber. If a water based system is used with a relatively thick (30k) tow, more time is needed than when treating a thin (5k) tow containing an acetone solvent, which may flash off without significant heating. In any event, the drying station removes the liquid solvent leaving a solid tackifier residue integrated among the fibers in the tow. FIG. 2 is an illustrative view of a cross section of the fiber 12, with a solidified tackifier 13 between fibers 14. Generally, such a tow is fairly stiff and rigid, as the resin forms a frangible solid which holds the fibers together. Such a tow is incapable of being machine fed in subsequent operations such as in braiding, weaving, etc.

The dry rigid fiber tow 12 is then subjected to a fracturing station 15. In the fracturing station, the relatively brittle tackifier is fractured by severe bending. Referring still to FIG. 1, the fiber tow 12 is passed around a series of rollers 16 of relatively small radius. As the fiber tow follows the serpentine path over these rollers, the tackifier is fractured but still remains distributed among the fibers in the tow. FIG. 3 shows the cross section of the tow 17 after fracturing. While the tackifier remains, it is fractured into discrete particles 18, as opposed to the integrated solid 13 of FIG. 2. This allows the fiber to bend and be flexible.

Generally, the fracturing station is designed to break the tackifier without damaging the tow fibers. Consequently, any means for displacing the fibers within the tow can fracture the tackifier, such as by passing the tow over a series of rollers, which provides a relatively gentle method for treating the tackified tow such that the tackifier alone is fractured, with sufficient rollers provided such that the fiber becomes suitably pliable for machine feeding.

While four rollers are shown, the number and size of the rollers may vary with the type and size of fiber being treated. Further, alternative methods for rendering the fiber pliable may be used such as by passing the rigid fiber over a radius edge 19, as shown in FIG. 4a, or by squeezing the fiber tow between pinched rollers 20 as shown in FIG. 4b which cause the individual fibers to shift within the tow, thus breaking the tackifier to produce a pliable tow.

After the tow leaves the fracturing station, it is wound on to a spool 21 and set aside for further processing.

A pliable tackified tow in accordance with the invention can be used in a braiding, weaving or filament winding machine to the same extent as nontackified tow. For example, as shown in FIG. 5, a fiber layer 22 can be produced which has fiber tows 17 oriented in the 0°, 90° and 45° direction relative to the part axis or any combination thereof.

Consequently, woven cloth or fabric can be produced which inherently contains sufficient tackifier for producing a shaped dry fiber preform. These materials can be used in a ply lay up process to produce preforms which are readily tackified to hold the preformed shape.

For example, once an article has been braided, or produced from a lay up of oriented plies made of pliable tackified tow, it can be quickly heated to melt the tackifier contained within the fiber tows and cooled to resolidify the tackifier, thus producing a rigid preform ready for molding. Utilizing such a pliable tackified tow has an additional advantage as not only does it eliminate a treatment step during the production of the preform, it also eliminates the solvent or powder handling equipment which has typically been used. Such equipment, though needed for use when preparing the tackified tow, is much smaller and is centralized and of course it would not be needed in combination with the braiding, winding or weaving machines. Further, the tackifier is uniformly distributed among the fibers themselves, not just randomly distributed on the outer ply surfaces, and this assures more uniform adhesion when a preform is produced which enhances the debulking process as more fibers remain in the condensed debulked stage after cooling.

Generally, the fibers usable with the invention are those as described above which include glass, graphite, carbon, aramid and any other reinforcement fibers, depending on the strength and characteristic desired of the finished part. The tows can be of virtually any size, from 3k to 50k, with the fibers of any commercially available size. As stated previously, yarns produced from such tows can also be used in accordance with the invention, yarns meaning multiple tows which are assembled in a rope form, but which are also adaptable for machine feeding in a weaving, braiding or filament winding operation. Such a tackified yarn 23 is shown in FIG. 6, composed of a plurality of tows 24, each tow composed of fibers 25. A tackifier 26 is distributed among the fibers in each tow, as well as among each tow. The tackifier can be any of those known in the art, but preferably are those which are composed of thermosetting resins which are compatible with the ultimate resin used to produce the molded part.

While a preferred embodiment of the present invention has been shown and described, it will be understood by those skilled in the art that various changes or modifications can be made without varying from the scope of the present invention.

We claim:

1. A pliable tackified fiber tow comprising a plurality of fibers substantially uniformly coated with about 1–15 percent by weight, based on the weight of the fibers, of a tackifier, the tackifier being a solid material fractured into substantially discrete particles.

2. The tackified tow of claim 1 wherein the fiber tow is from a 3K to 50K tow.

3. The tackified tow of claim 1 wherein the fibers are selected from the group consisting of glass, aramid, graphite, carbon and combinations thereof.

4. The tackified tow of claim 1 wherein the tackifier is selected from the group consisting of epoxy, bismaleimide, polycyanate ester, vinyl ester and benzocyclobutene resins.

5. The tackified tow of claim 1 wherein from 4 to 12% tackifier based on the weight of the fibers, is present.

* * * * *